United States Patent [19]
Angelosanto

[11] 4,230,017
[45] Oct. 28, 1980

[54] PULL-TYPE BLIND FASTENER CONSTRUCTION

[75] Inventor: Donald J. Angelosanto, Huntington Beach, Calif.

[73] Assignee: Huck Manufacturing Company, Detroit, Mich.

[21] Appl. No.: 950,827

[22] Filed: Oct. 12, 1978

[51] Int. Cl.³ .............................................. F16B 13/06
[52] U.S. Cl. .............................................. 85/70; 85/7
[58] Field of Search .................. 85/15 P, 7, 70, 71, 85/72, 77, 78

[56] References Cited

U.S. PATENT DOCUMENTS

| | | | |
|---|---|---|---|
| 2,588,372 | 3/1952 | Erb . | |
| 2,887,003 | 5/1959 | Brilmyer | 85/72 |
| 3,203,300 | 8/1965 | Marschner | 85/7 |
| 3,215,024 | 11/1965 | Brilmyer et al. | 85/7 |
| 3,377,907 | 4/1968 | Hurd | 85/78 |
| 3,377,908 | 4/1968 | Stau et al. | 85/78 |
| 4,012,984 | 3/1977 | Matuschek | 85/70 |
| 4,112,811 | 9/1978 | King | 85/7 |
| 4,127,345 | 11/1978 | Angelosanto et al. | 85/72 X |

FOREIGN PATENT DOCUMENTS 1254584  1/1961  France .......................................... 85/78

Primary Examiner—Thomas J. Holko
Attorney, Agent, or Firm—Harness, Dickey & Pierce

[57] ABSTRACT

An improved pull-type blind fastener is disclosed comprising a tubular sleeve having a mandrel longitudinally movable within the sleeve for forming a head on one end thereof and a locking collar adapted to be moved into engagement with a lock pocket provided on the mandrel as the fastener is set whereby the mandrel is locked within the sleeve. The locking collar is generally cylindrical in shape having a bore extending therethrough which bore is defined by an inner portion of a first predetermined diameter and an outer portion of a diameter greater than the first predetermined diameter. The enlarged diameter outer portion operates to provide a relieved area at the outer end of the locking collar and immediately adjacent the nose assembly of an installation tool so as to prevent flow or wiping of collar material axially outwardly between the mandrel and the nose assembly of the installation tool during setting of the fastener.

16 Claims, 6 Drawing Figures

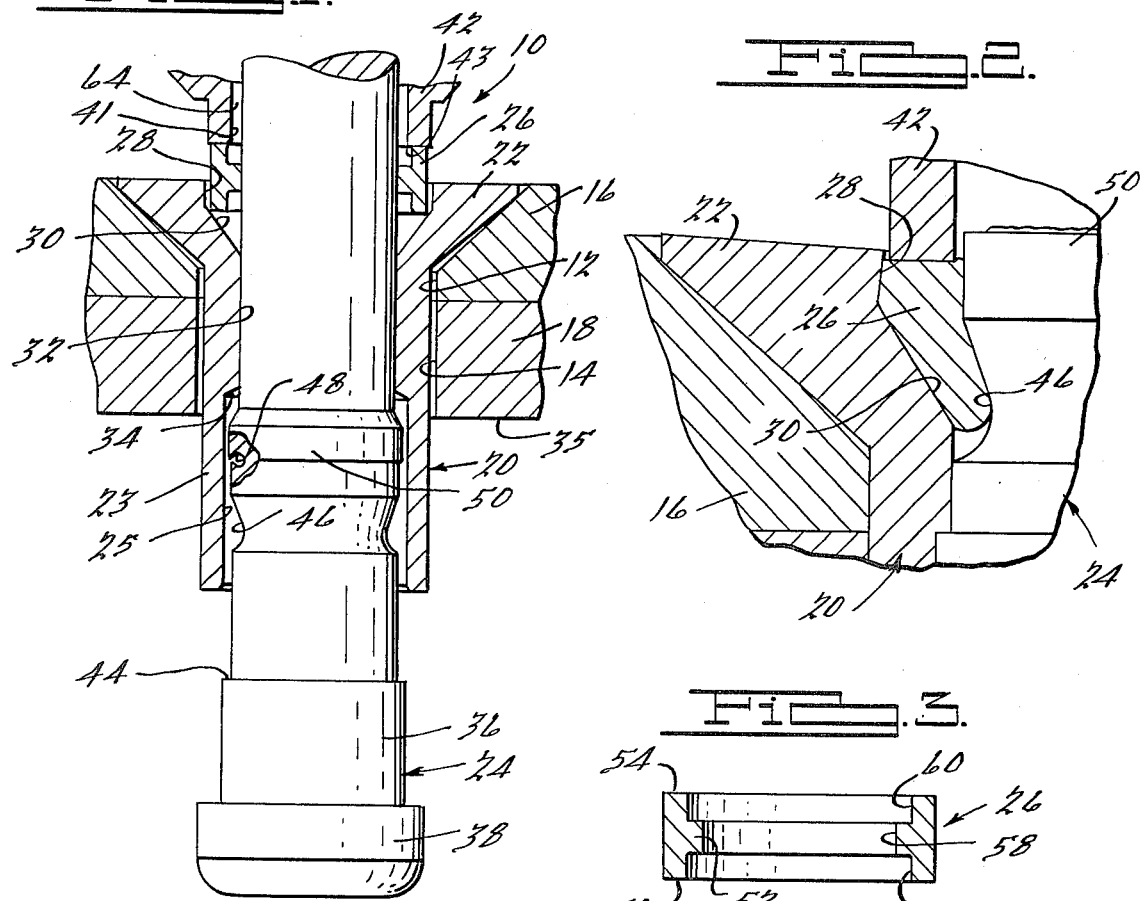

PULL-TYPE BLIND FASTENER CONSTRUCTION

BACKGROUND AND SUMMARY OF THE INVENTION

The present invention relates generally to blind fasteners and more particularly to pull-type blind fasteners in which the pulling mandrel is locked within the tubular sleeve by a locking collar being forced into a lock pocket provided on the shank of the mandrel.

Pull-type blind fasteners of the type comprising a tubular sleeve having a preformed head on one end thereof and a mandrel longitudinally movable within the sleeve so as to form a head on the other end of the sleeve in response to a pulling force applied to the mandrel are well known in the art, the same being commonly used to join a plurality of workpieces when access is restricted to only one side of the workpieces. These pull-type blind fasteners can be either mandrel retaining or non-mandrel retaining depending upon whether a portion of the mandrel is retained within the sleeve subsequent to setting of the fastener.

In mandrel retaining pull-type blind fasteners, the mandrel can be retained by friction or a mechanical lock. The present invention deals with the latter type of blind fastener. With mechanically locked mandrels, the preformed head of the sleeve is commonly provided with an enlarged diameter counterbore opening through which the mandrel projects while the mandrel is provided with a lock pocket which cooperates with the counterbore in a manner to be seen. As the fastener is set, the pulling force exerted on the mandrel causes formation of a head on the inner end of the sleeve as the mandrel and associated lock pocket are moved longitudinally into the area of the enlarged diameter counterbore. An annular locking collar positioned at least partially within the counterbore is then forced into the lock pocket so as to lock the mandrel in position relative to the sleeve. Continued pulling force on the mandrel will then cause the outwardly projecting portion thereof to separate at a controlled predetermined location proximate to the outer surface of the preformed head on the sleeve.

Commonly, a double acting tool is utilized for setting such fasteners. Examples of such fasteners being set by double acting tools are shown in the following U.S. Pat. Nos.: 3,285,121; 3,915,055. In the present invention, however, only a single acting tool is utilized in which all of the loads are taken between the mandrel and the separate locking collar. The single action tool, as utilized for installation of these fasteners, has a nose assembly provided with an opening into which the mandrel is received. This nose assembly has a forward end portion adapted to engage the annular locking collar and force it into the counterbore and the appropriately positioned lock pocket once the mandrel head forming operation is completed. Typically, the mandrel is provided with an extruding land of a slightly enlarged diameter which operates to expand the tubular sleeve as it passes therethrough. Accordingly, as this extruding land passes through the nose assembly, the opening of the nose assembly is of a size to accommodate same. However, as the collar is closely fitted to the mandrel, the extruding land operates to wipe a portion of the collar material into the opening of the tool nose assembly as it passes therethrough. With conventional collars having constant diameter openings therethrough, this collar material or collar flash is wiped into the tool nose assembly. While the tool nose assembly opening may initially be closely sized to accommodate the extruding land with a minimum clearance, normal wear initially from the extruding land and thereafter from the wiped collar material causes this clearance to progressively increase thereby resulting in reduced tool life and may even cause breakage of the nose assembly. As this clearance increases, the amount of collar material or flash increases and forms an unacceptable protrusion once the end portion of the mandrel has been separated preferably at a point substantially flush with the preformed head on the sleeve. Such collar flash must then be severed, ground or otherwise removed by a separate operation thereby increasing the installation time and associated costs.

Accordingly, the present invention provides a mechanical locking mandrel retaining pull-type blind fastener which alleviates this problem by providing an enlarged diameter opening immediately adjacent the outer end portion of the annular locking collar. In a preferred form, the locking collar is formed with symmetrical end portions each having an enlarged diameter counterbore therein which counterbores terminate at a central or intermediate portion of a diameter approximately equal to that of the mandrel. Thus, the counterbore provides an area which is radially outwardly offset with respect to both an inner or central portion of the locking collar as well as with respect to the locking collar engaging end portion of the tool nose assembly thereby precluding the wiping action of the extruding land from causing material flow between the mandrel and the end portion of the installation tool and hence eliminating the build-up of collar flash.

Additional advantages and features of the present invention will become apparent from the subsequent description and the appended claims taken in conjunction with the accompanying drawings.

BRIEF DESCRIPTION OF THE DRAWINGS

FIG. 1 is a plan view with some parts shown in elevation, and others in section, of a three piece fastener including a sleeve, mandrel, and locking collar embodying features of the present invention and shown located in prepared openings in workpieces with an end portion of a nose assembly of an installation tool engaging the locking collar prior to setting of the fastener;

FIG. 2 is an enlarged view of a portion of the fastener illustrated in FIG. 1 with the locking collar shown in a set condition;

FIG. 3 is an enlarged sectioned view of the locking collar shown in FIG. 1;

FIG. 4 is an enlarged sectioned view of another embodiment of a locking collar in accordance with the present invention;

FIG. 5 is a view similar to that of FIGS. 3 and 4 but illustrating another embodiment of a locking collar in accordance with the present invention; and FIG. 6 is a view similar to that of FIG. 1 but illustrating a fastener having a preformed protruding head provided on the sleeve portion thereof.

DESCRIPTION OF THE PREFERRED EMBODIMENTS

Referring now to the drawings and in particular to FIGS. 1–3, there is shown a pull-type blind fastener indicated generally at 10 installed in aligned openings 12 and 14 of workpieces 16 and 18 which are to be joined.

Fastener 10 is of the type disclosed in copending application Ser. No. 835,363 entitled "Lock Spindle Blind Fastener For Single Action Application" filed Sept. 21, 1977 now U.S. Pat. No. 4,127,345 and assigned to the same assignee as the present application which disclosure is hereby incorporated by reference.

Fastener 10 comprises a sleeve 20 having a preformed countersunk head 22 provided on the outer end thereof and an integral elongated tubular body portion 23 extending through openings 12 and 14, an elongated mandrel 24 longitudinally movable within bore 25 of sleeve 20 and an annular locking collar 26.

Head 22 of sleeve 20 is provided with an outwardly opening straight wall counterbore 28 disposed concentrically with and of a larger diameter than bore 25. Counterbore 28 terminates at its inner end at an entry resistance angle portion 30 which interconnects counterbore 28 and bore 25. Bore 25 also has a reduced diameter portion 32 extending from entry resistance angle portion 30 to a longitudinally inwardly facing shoulder 34 disposed adjacent surface 35 of workpiece 18. It should be noted, however, that while the preferred embodiment of sleeve 20 includes a straight wall counterbore 28, it is believed the present invention may also be utilized in conjunction with a sleeve having a conventional countersunk opening for receiving the locking collar.

Mandrel 24 comprises an elongated cylindrical shank portion 36 having an enlarged diameter head 38 formed on the inner end thereof, head 38 having a diameter approximately equal to that of body portion 23. As best seen in FIG. 1, shank portion 36 extends longitudinally or axially outwardly beyond head 22 of sleeve 20 and is adapted to be received within an opening 41 provided through an end portion 43 of a nose assembly 42 of a conventional single action installation tool.

Shank portion 36 of mandrel 24 has an axially outwardly facing stop shoulder 44 which is adapted to engage shoulder 34 of sleeve 20 when fastener 10 is fully set. Disposed axially outwardly of shoulder 44, shank portion 36 is provided with an annular lock pocket 46 and an annular breakneck groove 48. As shown, breakneck groove 48 is positioned adjacent the inner end of a slightly enlarged diameter extruding land portion 50 of shank 36 which portion operates to radially expand reduced diameter portion 32 of sleeve 20 as mandrel 24 is moved longitudinally outwardly thereby insuring openings 12 and 14 are filled by fastener 10.

Locking collar 26 is positioned partially within straight wall counterbore 28 of head 22 and in a preferred form is of a generally cylindrical shape having a substantially constant outside diameter from end to end which diameter is only slightly less than the diameter of counterbore 28. Locking collar 26 has a central portion 52 intermediate opposite end portions 54 and 56 of a predetermined wall thickness which in part defines an opening 58 (see FIG. 3) extending therethrough of a diameter approximately equal to the diameter of shank portion 36. As shown, end portions 54 and 56 are symmetrical and of a reduced wall thickness so as to define respectively openings 60 and 62 of diameters greater than the diameter of opening 58 and hence greater than the diameter of opening 41 provided in end portion 43. Locking collar 26 preferably is of the split ring type and will be press fitted onto shank portion 36 of mandrel 24. Thus, central portion 52 may operate to guide mandrel 24 during setting of the fastener.

In order to install the fastener of the present invention, fastener 10 is first inserted in aligned openings 12 and 14 with mandrel 24 and locking collar 26 in the position illustrated in FIG. 1. Thereafter, the outer end of locking collar 26 is engaged by the end portion 43 of nose assembly 42 of a conventional, single action, pull-type installation tool. Only a portion of the nose assembly of such installation tool is illustrated but its construction and function are well known in the art. Generally speaking, the projecting end of the mandrel is gripped by jaws (not shown) within the installation tool to pull the mandrel 24 and apply the reaction force against the locking collar 26 via the nose portion 43 of nose assembly 42.

The lock collar 26 is received within the straight counterbore 28 and while in the illustration a slight spacing is shown, the fit is such that the collar 26 is supported by the wall of such counterbore 28 with central portion 52 embracing mandrel 24. The inner end of the collar thus rests against the angular wall 30. As the mandrel 24 is pulled longitudinally through sleeve 20, extruding land portion 50 will move axially upwardly through reduced diameter portion 32 of sleeve 20 thereby effecting a hole filling radial outward expansion of sleeve 20. As the tool continues to apply a pulling force on mandrel 24, extruding land portion 50 will move through collar 26 and into opening 41. As extruding land portion 50 moves through opening 58, a portion of the collar material will be wiped upwardly into opening 60 or 62. As opening 60 is of a diameter sufficient to allow extruding land portion 50 to pass therethrough, substantially no collar material will be wiped into opening 41. As mandrel 24 is pulled by the action of tool 42, a blind bulbed head will be formed on the inner end of sleeve 20. When the blind bulbed head has been completely formed, stop shoulder 44 will have moved into abutting relationship with shoulder 34 and lock pocket 46 will be positioned within counterbore 28.

As the pull on the mandrel continues, with a build-up in the reaction force on the end portion 43 of nose assembly 42 against lock collar 26, the lock collar is forced into the lock pocket 46. As locking collar 26 is forced into lock pocket 46 of mandrel 24, the material of the collar will flow in such a manner as to substantially fill the lock pocket. Thus, the formation of collar flash is effectively prevented or minimized thereby promoting the formation of a relatively flush set fastener without the need for any subsequent finishing operations.

Another embodiment of a locking collar 66 in accordance with the present invention is illustrated in FIG. 4. Collar 66 also is of a generally cylindrical shape having a substantially constant outside diameter and a central opening 68 extending therethrough. However, in this embodiment central opening 68 is defined by a first or upper inwardly converging frusto-conical sidewall 70 and a second or lower inwardly converging frusto-conical sidewall 72. Thus, the diameter of opening 68 varies continuously from a maximum immediately adjacent the opposite ends thereof to a minimum at the center portion 74 thereof which minimum diameter will preferably be only slightly larger than the diameter of the shank portion of a mandrel with which it is to be used. Similarly, the collar sidewall thicknesses vary from a minimum adjacent the opposite ends thereof to a maximum at the center portion 74 thereof.

Another embodiment of a locking collar in accordance with the present invention is illustrated in FIG. 5 being indicated generally at 76. Locking collar 76 is also cylindrical in shape having a substantially constant outside diameter. However, in this embodiment, a central or intermediate portion 78 of a predetermined axial width has a minimum diameter only slightly larger than the diameter of a mandrel with which it is to be used. An upper portion 80 is provided having a wall thickness which increases in an axially inward direction so as to define a continuously decreasing diameter opening. Similarly, a lower portion 82 is provided also having an axially outwardly decreasing wall thickness defining an increasing diameter opening. It should be noted that while the specific collar geometry may vary, all of the embodiments provide a collar having an inside diameter as measured as the extreme outer end thereof which is equal to or greater than the diameter of extruding land portion 50 and greater than the diameter of opening 41 of the tool nose assembly. Thus, the tool engaging end surface of the collar is radially outwardly offset relative to surface 43 of nose assembly 42 and defines a void or space therebetween. This volume of the space defined by this relieved portion will be selected so as to effectively prevent flow of collar material from reaching the clearance space between the mandrel and installation tool nose assembly. Also, it should be noted that while clearance space 64 may be extremely small with a new tool so as to thereby limit the formation of collar flash, continued use of the tool results in an increasing larger clearance due to normal wear and thus allowing formation of larger collar flash.

While the various embodiments illustrated and described above have been addressed to a pull-type blind fastener having a countersunk head provided thereon, the present invention is also equally applicable for use with a protruding head pull-type blind fastener as is indicated generally at 84 of FIG. 6. Fastener 84 also includes a sleeve 86 having a preformed protruding head 88 provided on one end of an integral tubular body 90. A mandrel 24' is also provided which is substantially identical to mandrel 24 and is longitudinally movable within bore 92 of sleeve 86.

Head 88 of fastener 84 has a straight wall counterbore 94 disposed concentrically with bore 92 and of a slightly larger diameter which terminates in an entry resistance angle 96 all of which are substantially the same as described with reference to fastener 10 above. A locking collar 26' is also disposed in part within counterbore 94 which is identical to collar 26 and thus has corresponding portions indicated by like numerals primed. The operation and setting of fastener 84 is identical to that described with reference to fastener 10.

It has been found that a locking collar of the configuration illustrated in FIGS. 1–3 will provide good results when openings 60 and 62 are each of a depth approximately equal to 15–20% of the axial length of collar 26 and of a diameter sufficient to reduce the wall thickness of portions 54 and 56 to approximately 50% of the wall thickness of portion 52. It should be noted that while each of the embodiments of the locking collar in accordance with the present invention has been described and illustrated as having a construction which is symmetrical about a radial plane passing through the axial center of the locking collar, the locking collar will perform equally well with an asymmetrical design in which the center portion wall thickness and hence minimum diameter is maintained constant in an axial direction from the central portion to the outer end thereof. However, if this asymmetrical construction is utilized, care must be exercised in assembling the collar to the mandrel and sleeve to insure the end portion having the reduced wall thickness and hence enlarged diameter opening is positioned away from the counterbore.

Thus, the present invention provides an improved pull-type blind fastener which provides means for locking the mandrel within the sleeve while avoiding the formation of collar flash thereby reducing the cost of installation thereof.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:

1. An improved pull-type blind fastener for use in securing a plurality of workpieces together, said fastener being adapted to be set by use of a single action pulling tool having a nose assembly, said fastener comprising:

a tubular sleeve having a preformed head at one end thereof, said preformed head having an enlarged diameter opening provided in the outer end thereof;

a mandrel extending longitudinally through said sleeve and movable with respect thereto in response to a pulling force applied by said tool to form a head on the other end of said tubular sleeve during setting of said fastener, said mandrel further having a lock pocket provided thereon; and an annular locking collar adapted to be positioned partially within said opening, said annular locking collar surrounding said mandrel and including an inner portion engageable with a portion of said mandrel as said mandrel is moved through said collar member, said portion of said mandrel being disposed axially outwardly from said lock pocket, said annular locking collar being substantially tubular with a substantially constant outside diameter and having at least one end portion engageable with said nose assembly of said installation tool and operative to enable said pulling force to be exerted between said mandrel and said sleeve by said pulling tool so as to form said head, said one end further having a wall thickness less than the wall thickness of said inner portion whereby said one end portion engages said nose assembly in a radially outwardly offset relationship to an opening in said nose assembly whereby said mandrel may be moved through said collar by said pulling tool so as to set said fastener without formation of collar flash.

2. A pull-type blind fastener as set forth in claim 1 wherein said wall thickness of said at least one end portion increases toward said axially inner portion.

3. A pull-type blind fastener as set forth in claim 1 wherein said annular locking collar has symmetrical end portions.

4. A pull-type blind fastener as set forth in claim 1 wherein said annular locking collar has a radially extending annular shoulder interconnecting said at least one end portion and said axially inner portion.

5. A pull-type blind fastener as set forth in claim 4 wherein said axially inner portion has a substantially constant wall thickness.

6. A pull-type blind fastener as set forth in claim 4 wherein said annular locking collar has a predetermined length and said one end portion has an axial length approximately within the range of 15 to 20% of said predetermined length.

7. A pull-type blind fastener as set forth in claim 6 wherein said axially inner portion of said annular locking collar has a predetermined wall thickness and said end portion has a wall thickness approximately 50% of said predetermined thickness.

8. An improved pull-type blind fastener for use in securing a plurality of workpieces together, said fastener comprising:
a sleeve having a preformed head provided on one end thereof;
a mandrel positioned for longitudinal movement within said sleeve to form a head on the other end of said sleeve, said mandrel having an annular lock pocket provided thereon and another portion of a predetermined diameter operative to expand said sleeve;
an opening defining an inwardly directed entry resistance portion provided in said sleeve head;
an annular locking collar positioned in part within said opening and having a bore through which said mandrel projects, said locking collar being adapted to be moved inwardly along said entry resistance portion into engagement with said lock pocket of said mandrel by action of an end portion of an installation tool nose assembly engaging said locking collar as said fastener is set, said nose assembly having an opening of a diameter only slightly greater than said predetermined diameter into which said mandrel projects, said bore of said locking collar being defined by an inner portion of a diameter less than said predetermined diameter and an outer portion of a diameter greater than said predetermined diameter, said outer portion being engageable with said tool end portion in a radially offset relationship relative to said nose assembly opening, said outer portion thereby defining a recess in said collar adjacent said opening into which material from said inner portion may be wiped by said mandrel as it is moved through said collar by action of said pulling tool whereby said predetermined diameter portion may be moved through said locking collar and said locking collar may be moved into said opening without formation of collar flash.

9. A pull-type blind fastener as set forth in claim 8 wherein said inner portion of said bore has a substantially constant diameter and said outer portion of said bore has a substantially constant diameter whereby said inner and outer portions define a radially extending annular shoulder extending therebetween.

10. A pull-type blind fastener as set forth in claim 9 wherein said locking collar is symmetrical about a radial plane extending perpendicular to the longitudinal axis thereof.

11. A pull-type blind fastener as set forth in claim 8 wherein said inner portion of said bore is of a substantially constant diameter and said outer portion of said bore has an axially inwardly decreasing diameter.

12. An improved pull-type blind fastener for use in securing a plurality of workpieces together, said fastener comprising:
a sleeve having a preformed head on one end thereof, an elongated tubular body portion and a bore extending therethrough,
an elongated mandrel extending movably through said sleeve and having a head provided on another end thereof, said mandrel head being operative to form a head on another end of said tubular sleeve in response to a pulling action exerted on said mandrel by an installation tool, said mandrel further having a lock pocket provided thereon,
a straight wall counterbore provided in said head terminating at an entry resistance angle; and
an annular locking collar positioned partially within said counterbore and having a bore through which said mandrel extends, said locking collar having an end portion engageable by a nose assembly of said installation tool whereby said locking collar is operative to enable said pulling tool to exert a pulling force between said mandrel and said sleeve, said bore having a first portion of a substantially constant diameter extending axially inwardly from said terminal end and radially spaced from said mandrel and a second portion of a substantially constant diameter less than the diameter of said first portion and engageable with a portion of said mandrel as said mandrel is moved through said collar, said first portion defining an annular recess within said collar into which material from said second portion may be wiped by said mandrel whereby said locking collar is operative to reduce the possibility of formation of collar flash during setting of said fastener.

13. A pull-type blind fastener as set forth in claim 12 wherein said preformed head on said sleeve is a protruding head.

14. A pull-type blind fastener as set forth in claim 12 wherein said axially inner portion of said annular locking collar has a predetermined wall thickness and said end portion has a wall thickness approximately 50% of said predetermined thickness.

15. A pull-type blind fastener as set forth in claim 14 wherein said annular locking collar has a predetermined length and said outer portion has an axial length within the range of approximately 15 to 20% of said predetermined length.

16. A pull-type blind fastener as set forth in claim 15 wherein said annular locking collar has symmetrical end portions.

* * * * *